United States Patent
Kozak

(10) Patent No.: US 11,235,872 B2
(45) Date of Patent: Feb. 1, 2022

(54) METHOD AND APPARATUS FOR UTILIZING AN UNMANNED AIR VEHICLE TO DEFINE OR PROVIDE GUIDANCE ALONG A ROUTE

(71) Applicant: HERE GLOBAL B.V., Eindhoven (NL)

(72) Inventor: Frank Kozak, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 454 days.

(21) Appl. No.: 16/171,510

(22) Filed: Oct. 26, 2018

(65) Prior Publication Data
US 2020/0130827 A1  Apr. 30, 2020

(51) Int. Cl.
| | | |
|---|---|---|
| B64C 39/02 | (2006.01) | |
| B64D 47/02 | (2006.01) | |
| E01F 9/576 | (2016.01) | |
| G01C 21/36 | (2006.01) | |
| G08G 1/052 | (2006.01) | |

(Continued)

(52) U.S. Cl.
CPC ............ *B64C 39/024* (2013.01); *B64D 47/02* (2013.01); *E01F 9/576* (2016.02); *G01C 21/362* (2013.01); *G01C 21/3614* (2013.01); *G01C 21/3641* (2013.01); *G08G 1/052* (2013.01); *G08G 1/065* (2013.01); *G08G 1/09* (2013.01); *B62J 50/25* (2020.02); *B64C 2201/12* (2013.01)

(58) Field of Classification Search
None
See application file for complete search history.

(56) References Cited

U.S. PATENT DOCUMENTS 6,411,896 B1   6/2002   Shuman et al.
2015/0134143 A1   5/2015   Willenborg
(Continued)

FOREIGN PATENT DOCUMENTS

WO   WO 2017/122951 A1   7/2017

OTHER PUBLICATIONS

Drones—The Next Big Thing In Cycle Safety, Or a Case of Too Much Blue Sky Thinking? [online] [retrieved Dec. 3, 2018]. Retrieved from the Internet: <URL: https://road.cc/content/news/109510-drones-next-big-thing-cycle-safety-or-case-too-much- . . . > (dated Jan. 28, 2014 ) 7 pages.

(Continued)

*Primary Examiner* — Nicholas K Wiltey
(74) *Attorney, Agent, or Firm* — Alston & Bird LLP

(57) ABSTRACT

An apparatus, method and system utilize an unmanned air vehicle (UAV) in order to support the definition and use of routes by bicyclists, pedestrians or scooters. With respect to defining a bicycle route a map database is accessed that represents roads segments in a geographic area. The map database contains map data that indicates attributes of the road segments. The bicycle route is then defined from an origin to a destination based upon the map data indicative of attributes of the road segments. In this regard, the bicycle route is defined to include one or more road segments that allow bicycle traffic unaccompanied by a UAV and one or more road segments for which bicycle traffic is unauthorized unless accompanied by a UAV. The bicycle route is subsequently caused to be provided to the bicyclist or a device accessible to the bicyclist.

13 Claims, 6 Drawing Sheets

(51) Int. Cl.
*G08G 1/065* (2006.01)
*G08G 1/09* (2006.01)
*B62J 50/25* (2020.01)

(56) References Cited

U.S. PATENT DOCUMENTS

| | | |
|---|---|---|
| 2016/0196525 A1* | 7/2016 | Kantor ................. G08G 5/0013 |
| | | 705/330 |
| 2016/0272317 A1 | 9/2016 | Cho et al. |
| 2017/0235308 A1 | 8/2017 | Gordon et al. |
| 2017/0287242 A1* | 10/2017 | Meganathan ......... B64C 39/024 |
| 2018/0029706 A1 | 2/2018 | Baruch |
| 2019/0377345 A1* | 12/2019 | Bachrach ................. G06T 7/20 |
| 2020/0341471 A1* | 10/2020 | Kozak .................. G06K 9/0063 |
| 2021/0080926 A1* | 3/2021 | Rubinson ............... B25J 11/008 |

OTHER PUBLICATIONS

The 7 Best Follow You Drones [New for 2018]—Follow Me Drone Review [online] [retrieved Dec. 3, 2018]. Retrieved from the Internet: <URL: https://www.dronethusiast.com/drones-that-follow-you/> (dated 2018) 10 pages.

2018: The Year U.S. Fighter Pilots Could Get Drone Wingmen | War Is Boring [online] [retrieved Dec. 3, 2018]. Retrieved from the Internet: <URL: https://warisboring.com/2018-the-year-u-s-fighter-pilots-could-get-drone-wingmen/> (dated Apr. 12, 2016) 5 pages.

* cited by examiner

METHOD AND APPARATUS FOR UTILIZING AN UNMANNED AIR VEHICLE TO DEFINE OR PROVIDE GUIDANCE ALONG A ROUTE

TECHNOLOGICAL FIELD

An example embodiment relates generally to the use of unmanned air vehicles and, more particularly, to the use of unmanned air vehicles to support definition and/or use of a route or lane by bicycles, pedestrians or scooters.

BACKGROUND

Bicyclists ride upon many of the same roads that are utilized by motorized vehicles. This use of the same roads by both bicyclists and motorized vehicle creates a number of challenges for bicyclists and due to the size, weight and speed of the motorized vehicles, the results can sometimes be difficult for bicyclists.

Some of the roads that are shared by bicyclists and motorized vehicles include dedicated bicycle lanes. The dedicated bicycle lanes may extend along one side of the road and are marked so as to visibly indicate the presence of the bicycle lane both to bicyclists and to drivers of the motorized vehicles. The use of bicycle lanes may reduce potential hazards to bicyclists presented by the motorized vehicles; however there remains room for improvement.

Only some roads include bicycle lanes. Thus, some bicycle routes include one or more roads that do not have bicycle lanes, thereby again subjecting the bicyclist to the difficulties associated with sharing the road with motorized vehicles. Consequently, the bicycle routes that are considered to be desirable may be limited as a result of the limited availability of bicycle lanes and the heavy traffic supported by some roads. Moreover, the roads that are able to be utilized by bicyclists are further limited since some roads do not permit bicyclists. For example, expressways do not permit bicyclists, thereby further limiting the bicycle routes that are available.

BRIEF SUMMARY

An apparatus, method and system are provided in accordance with an example embodiment in order to utilize an unmanned air vehicle (UAV) in order to support the definition and use of routes by bicyclists, pedestrians or scooters. For example, a method and apparatus are provided in order to define a bicycle route that includes one or more road segments for which bicycle traffic is unauthorized unless accompanied by a UAV. As such, the method and apparatus of this example embodiment provide for more and different bicycle routes to be defined by utilizing one or more road segments that are not otherwise available to bicyclists unless accompanied by a UAV. A system and method are provided in accordance with another embodiment in order to guide or accompany a bicyclist, a pedestrian or a scooter along a route with one or more UAVs. Thus, the system and method of this example embodiment may increase the safety with which bicyclists, pedestrians or scooters travel along a route defined, at least partially, by one or more UAVs.

In an example embodiment, an apparatus configured to define a bicycle route for bicyclists is provided. The apparatus includes at least one processor and memory including computer program code with the memory and the computer program code configured to, with the at least one processor, cause the apparatus to access a map database that represents roads segments in a geographic area. The map database contains map data that indicates attributes of the road segments. The apparatus is also caused to define the bicycle route from an origin to a destination based upon the map data indicative of attributes of the road segments. In this regard, the bicycle route is defined to include one or more road segments that allow bicycle traffic unaccompanied by a UAV and one or more road segments for which bicycle traffic is unauthorized unless accompanied by a UAV. The apparatus is further a cause to provide the bicycle route to the bicyclist.

The apparatus of an example embodiment is also configured to cause a UAV to fly along at least a portion of the bicycle route in association with the bicyclist. In this example embodiment, the apparatus may be configured to cause the UAV to fly behind the bicyclist as a bicyclist rides along at least a portion of the bicycle route. The UAV of an example embodiment includes an image capture system configured to capture an image of a vehicle proximate to bicyclist in response to a determination that a speed of the vehicle exceeds the determined threshold or that a distance between the vehicle and the bicyclist is less than a defined separation distance. The UAV of an example embodiment is configured to fly into the path of travel of the vehicle in response to the determination that a distance between the vehicle and the bicyclist is less than a defined separation distance or that a speed of the vehicle exceeds a determined threshold.

The apparatus of an example embodiment is caused to define the bicycle route by establishing the bicycle route at least partially based upon a flight schedule of the UAV along the one or more road segments for which bicycle traffic is unauthorized unless accompanied by the UAV. In this example embodiment, the apparatus may be caused to determine the speed at which the bicycle needs to travel on the one or more road segments that allow bicycle traffic unaccompanied by the UAV in order to arrive at the one or more road segments for which bicycle traffic is unauthorized unless accompanied by the UAV in order synchronize with the flight schedule of the UAV. The apparatus of an example embodiment is caused to determine the speed at which the UAV will fly along the one or more road segments for which bicycle traffic is unauthorized unless accompanied by the UAV. The apparatus of this example embodiment is also caused to provide the bicycle route to the bicyclist along with the speed at which the UAV will fly.

The method is also provided in accordance with an example embodiment in order to define the bicycle route for a bicyclist. The method includes accessing a map database that represents the road segments in the geographic area. The map database contains map data that indicates attributes of the road segments. The method also includes defining the bicycle route from an origin to a destination based upon the map data indicative of attributes of the road segments. In this regard, the method defines the bicycle route to include one or more road segments that allow bicycle traffic unaccompanied by an unmanned air vehicle (UAV) and one or more road segments for which bicycle traffic is unauthorized unless accompanied by the UAV. The method further includes providing the bicycle route to the bicyclist.

In another example embodiment, a method is provided for accompanying a bicyclist, a pedestrian or a scooter including a motorized scooter with an engine not exceeding 50 cc or an electrical equivalent thereto along at least a portion of a route. The method of this example embodiment includes providing information regarding the route between an origin and a destination and having at least the portion along which an unmanned air vehicle (UAV) is scheduled to fly at a determined time. The method also includes causing the UAV to fly along the route, or at least the portion thereof, at the determined time in order to accompany the bicyclist, the pedestrian or the scooter along the route, or at least the portion thereof.

The method of an example embodiment also includes determining a number of bicyclists, pedestrians or scooters who plan to ride with the UAV along a UAV-enabled route. In an instance in which the number of bicyclists, pedestrians or scooters is less than a defined threshold, the method of this example embodiment cancels or modifies the operation of the UAV. In an example embodiment, the flight schedule of the UAV dynamically varies based upon weather and/or traffic. As such, the method of this example embodiment includes cancelling or modifying the flight or flight schedule of the UAV in an instance of adverse weather conditions or adverse traffic conditions. The method of an example embodiment further includes providing information regarding a speed at which the UAV is scheduled to fly along a UAV-enabled route, and the method then causes the UAV to fly along the UAV-enabled route at the speed. The method of an example embodiment also includes capturing an image of the vehicle proximate the bicyclist, the pedestrian or the scooter in response to a determination that a speed of the vehicle exceeds a determined threshold or that the path of travel of the vehicle is too close to the bicyclist, the pedestrian or the scooter, such as in an instance in which a distance between the vehicle and the bicyclist, the pedestrian or the scooter is less than a defined separation distance. In another example embodiment, the method includes causing the UAV to fly into a path of travel of the vehicle in response to a determination that a distance between the vehicle and the bicyclist, the pedestrian or the scooter is less than a defined separation distance or that that a speed of the vehicle exceeds the determined threshold.

An apparatus is also provided in accordance with an example embodiment in order to guide or accompany a bicyclist, a pedestrian or a scooter including a motorized scooter with an engine not exceeding 50 cc or an electrical equivalent thereto along at least a portion of a UAV-enabled route. The apparatus includes at least one processor and memory including computer program code with the memory and the computer program code configured to, with the at least one processor, cause the apparatus to provide information regarding the UAV-enabled route having at least a portion along which an unmanned air vehicle (UAV) is scheduled to fly or operate at a determined time. The apparatus of this example embodiment is also caused to cause the UAV to fly along at least the portion of the UAV-enabled route at the determined time in order to guide or accompany the bicyclist, the pedestrian or the scooter along at least the portion of the UAV-enabled route.

In a further example embodiment, a system is provided that is configured to define a lane for bicycle traffic on a road segment upon which motorized vehicles operate. The system includes at least one processor and memory including computer program code with the memory and computer program code configured to, with the at least one processor, cause the system to access a map database that represents road segments in a geographic area. The map database contains map data that indicates attributes of the road segments. The system of this example embodiment is also caused to deploy one or more unmanned air vehicles (UAVs) to define the lane along one or more of the road segments in the geographic area. The lane is adjacent to a portion of the one or more road segments upon which the motorized vehicles operate.

In an example embodiment, at least one of the one or more road segments is a road segment on which bicycle traffic is unauthorized unless accompanied by the UAV. The system of an example embodiment is caused to deploy the one or more UAVs so as to fly along the lane at a predetermined speed. The one or more UAVs of an example embodiment include an image capture system configured to capture an image of the vehicle proximate to the lane in response to a determination that a speed of the vehicle exceeds a determined threshold or that a path or projected path of the vehicle is close to the lane, such as in an instance in which a distance between the vehicle and the lane is less than a defined separation distance. In an example embodiment, one or more UAVs are configured to fly into a path of travel of the vehicle in response to a determination that a distance between the vehicle and the lane is less than a defined separation distance or that a speed of the vehicle exceeds a determined threshold. The system of an example embodiment is caused to deploy the one or more UAVs along the lane according to a schedule. The system of an example embodiment is further caused to modify the schedule based on a projected demand and/or weather or traffic conditions. In an example embodiment, at least one of the UAVs projects a beam of light along the one or more road segments to indicate a boundary of the lane for bicycle traffic.

A method is also provided in accordance with an example embodiment for defining a lane for bicycle traffic on a road segment upon which motorized vehicles operate. The method includes accessing a map database that represents road segments in a geographic area. The map database contains map data that indicates attributes of the road segments. The method also includes deploying one or more unmanned air vehicles (UAVs) to define the lane along one or more of the road segments in the geographic area. The lane is adjacent to a portion of the one or more road segments upon which motorized vehicles operate.

BRIEF DESCRIPTION OF THE DRAWINGS

Figure 1:
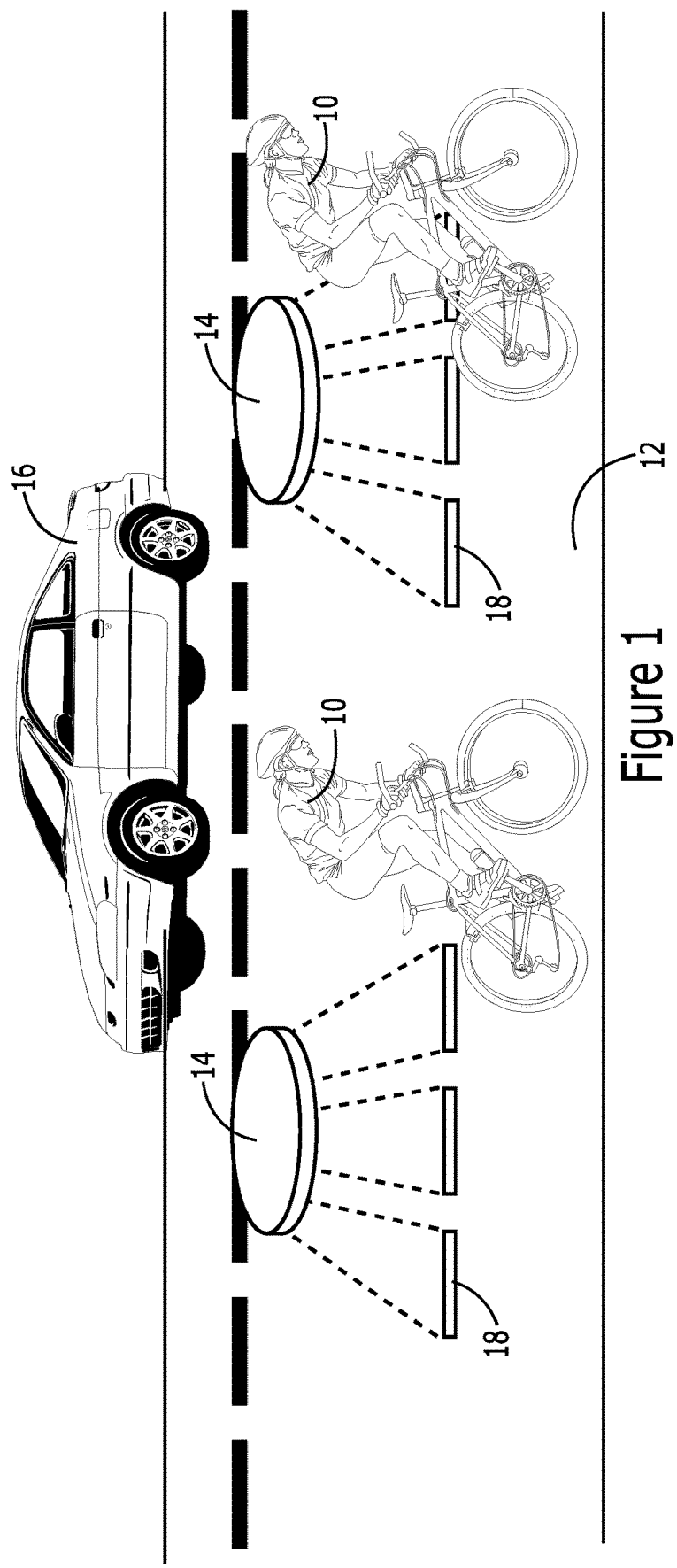
Figure 2:
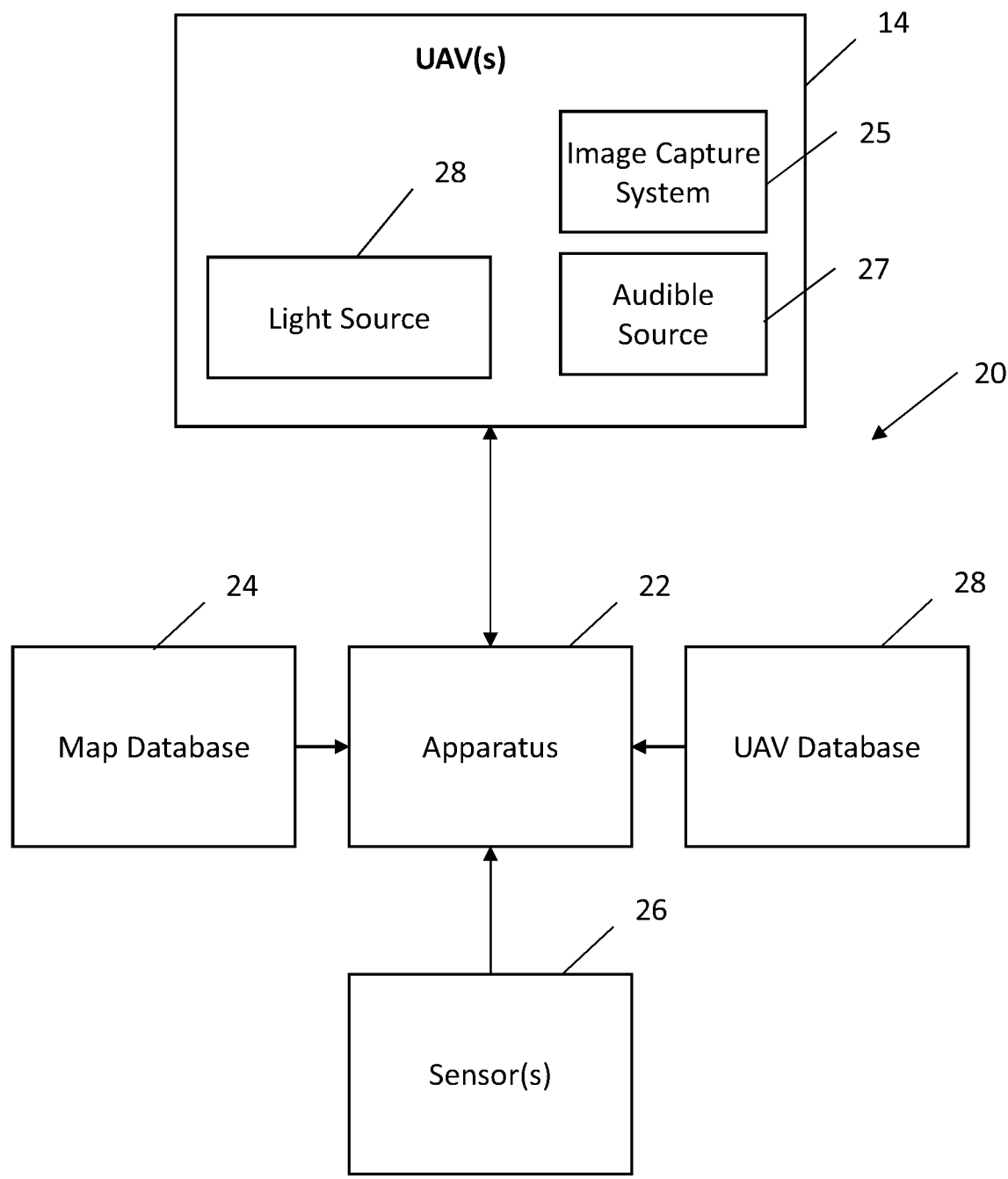
Figure 3:
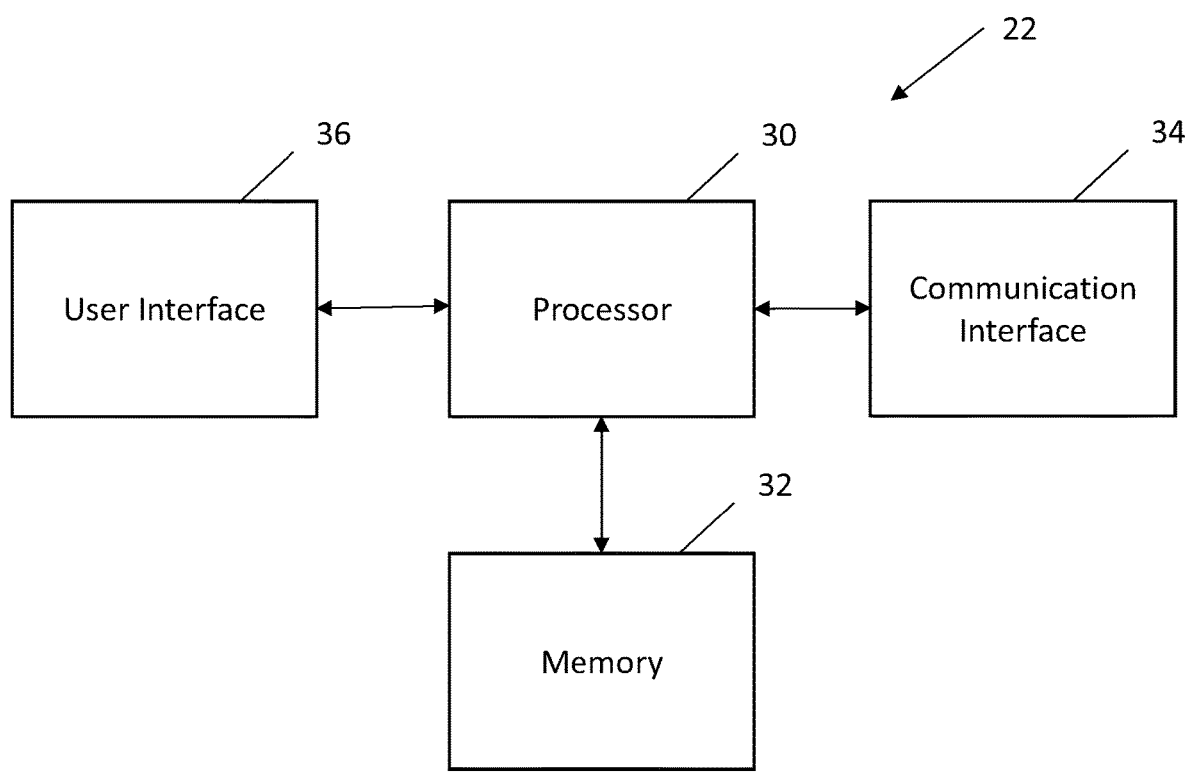
Figure 4:
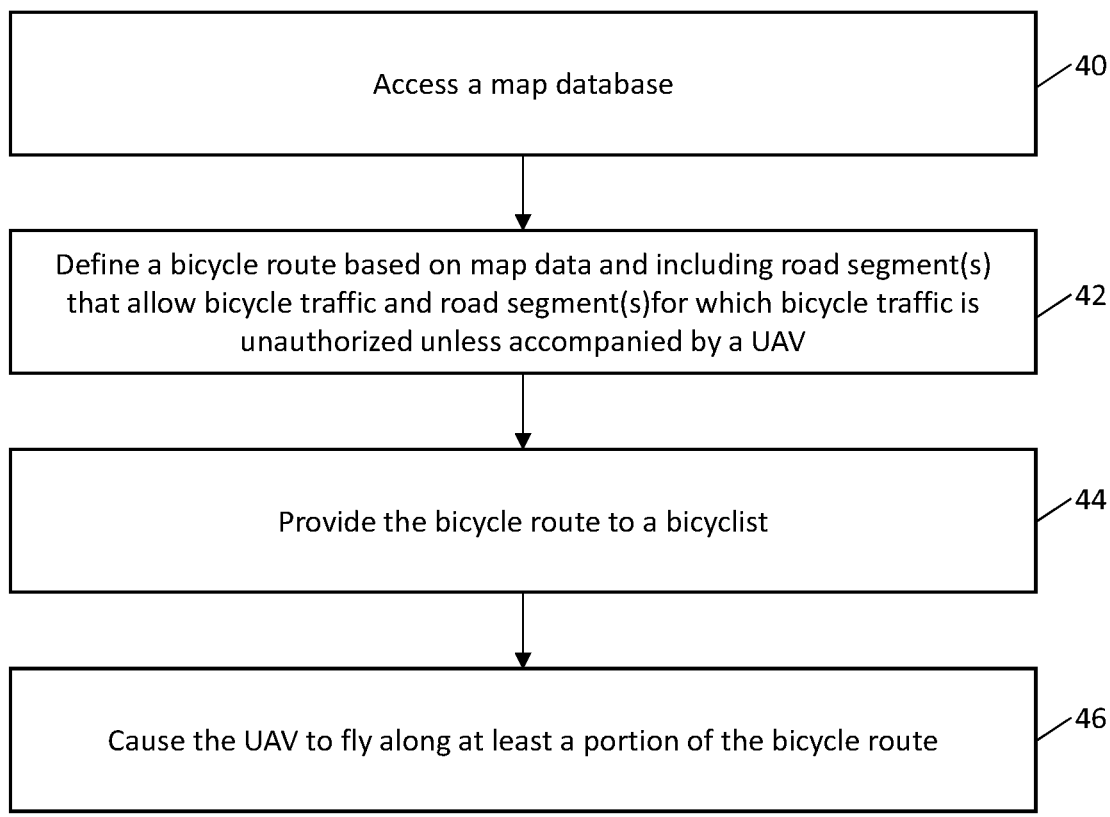
Figure 5:
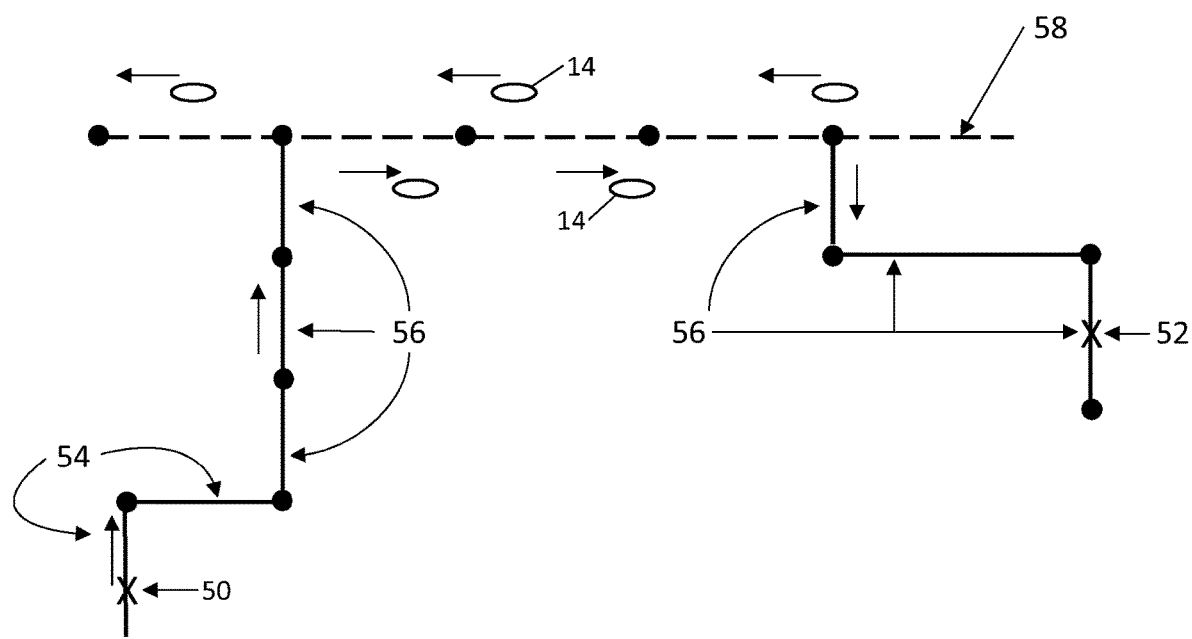
Figure 6:
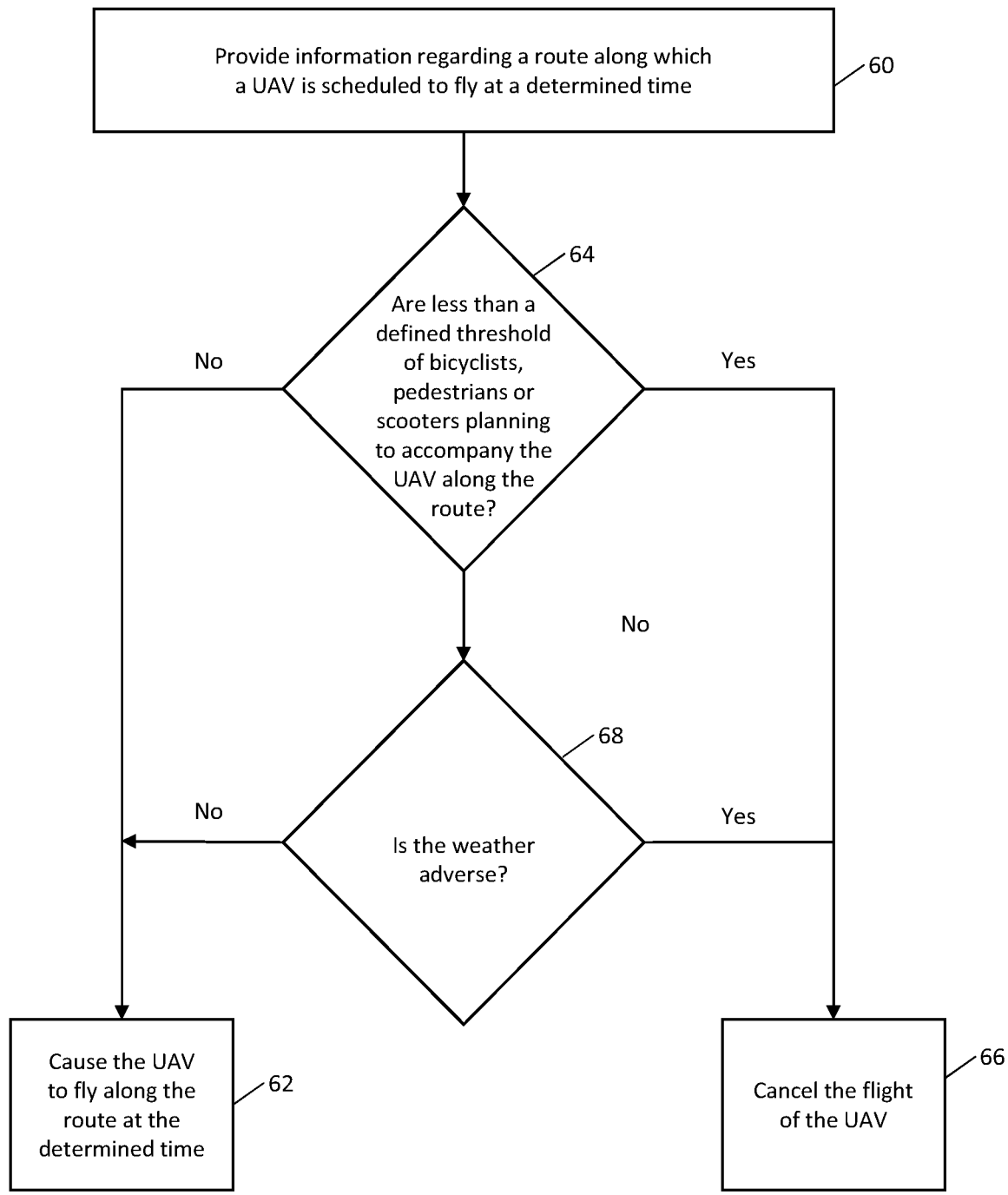

Having thus described the invention in general terms, reference will now be made to the accompanying drawings, which are not necessarily drawn to scale, and wherein:

FIG. 1 is a perspective view of an unmanned air vehicle that accompanies one or more bicyclists along a bicycle route in accordance with an example embodiment of the present disclosure;

FIG. 2 is a block diagram of a system including one or more of UAVs for guiding a bicyclist, a pedestrian or a scooter along a route in accordance with an example embodiment of the present disclosure;

FIG. 3 is a block diagram of an apparatus configured to define a route for bicyclist, pedestrian or scooter and/or to guide a bicyclist, pedestrian or scooter along the route in accordance with an example embodiment of the present disclosure;

FIG. 4 is a flow chart illustrating the operations performed, such as by the apparatus of FIG. 3, in accordance with an example embodiment of the present disclosure;

FIG. 5 is a graphical representation of a bicycle route that includes a road segment for which bicycle traffic is unauthorized unless accompanied by a UAV in accordance with an example embodiment of the present disclosure; and FIG. 6 is a flow chart illustrating the operations performed, such as by the system of FIG. 2, in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

In this specification, the word "route" may be used to refer to a specific series of road segments identified for a specific individual at a specific time leading from a starting point (also referred to as an origin) to an end point (also referred to as a destination). For example, an individual may use an application (app) to get a "route" (a series of connected road segments) from a current position (i.e., an "origin") to an inputted address (i.e., a "destination"). The word "route" may also be used to refer to one or more road segments along which specialized vehicles operate. Examples include a bus route, a postal route or a trolley route. This type of route is not necessarily prepared for a specific individual and may not have a specific origin or destination. In addition, there is another type of route, which refers to a series of one or more road segments identified for a specific purpose, but not necessarily for an individual. Examples include scenic routes, truck routes and by-pass routes. The meaning of the word "route" will be clear from its context in the specification.

A system, apparatus and method are provided in accordance with an example embodiment in order to define a route and to guide bicyclists, pedestrians or scooters along the route with the assistance of an unmanned air vehicle (UAV). By utilizing a UAV, the bicyclists, pedestrians or scooters may be guided in a manner that increases the desirability of the route for the bicyclists, pedestrians or scooters. Moreover, in some embodiments, the use of UAVs permits bicycle routes to be defined that include one or more road segments for which bicycle traffic is unauthorized unless accompanied by a UAV. As a result, an apparatus and method of this example embodiment increase the flexibility with which a network of road segments is utilized by increasing the modes of transportation that may utilize at least some of the road segments.

By way of example, FIG. 1 depicts a plurality of bicyclists 10 riding along a road segment 12. In accordance with an example embodiment, one or more UAVs 14 guide or accompany the bicyclists within a virtual lane defined along the road segment, that is, a lane generally along the side of the road segment in which the bicyclists ride but that is not necessarily and, in some embodiments, is not marked with a painted lane line or other painted demarcation. The boundaries of the virtual lane may be defined by the positioning of the UAVs 14 and may be defined along any part of the road, not only limited to the side of the road, and may be of any desired width. In this regard, the one or more UAVs fly with the bicyclist in order to alert drivers of motorized vehicles 16 that are sharing the road segment with the bicyclists of the presence of the bicyclists within the virtual lane. In order to increase the likelihood that the UAVs will be seen by the drivers, the one or more UAVs may fly along that portion of the virtual lane that extends furthest into the road segment, such as off the left shoulder of the bicyclist in FIG. 1, thereby flying between the bicyclist within the virtual lane and the motorized vehicles. (In countries in which vehicles travel on the left side of the road, the UAV may fly off the right shoulder of the bicyclist. Moreover, because the UAV may define the boundary of the virtual bicycle lane dynamically, the UAVs may define the bicycle lane on either side of the road in right-hand or left-hand drive countries. In a further alternative, UAVs may define bicycle lanes on both sides of a road, if desired.) Additionally, the UAVs may fly at a height above the road segment so as to be generally aligned with the windshields of most motorized vehicles, such as three to five feet above the road segment.

As shown in FIG. 1, a UAV 14 may fly slightly behind a bicyclist 10 so as to alert motorized vehicles 16 approaching from the rear of the bicyclist as to the presence of the bicyclist within the virtual lane. In some embodiments, the system includes a plurality of UAVs (two of which are shown in FIG. 1) spaced apart from one another along the length of a portion of the road segment 12 such that one UAV may lead the pack of bicyclists, another UAV may fly along with a center portion of the pack of bicyclists and yet another UAV may fly slightly to the rear of the pack of bicyclists in order to even further alert the drivers of the motorized vehicles as to the presence of the pack of bicyclists within the virtual lane. In one embodiment, the portion of the road segment along which the UAVs are spaced moves along the road segment with the bicyclists such that for any portion of the road segment the presence of the virtual lane is temporary while the bicyclists pass through that portion of the road segment with the motorized vehicles otherwise enjoying the full width of the road segment in other instances in which the virtual lane is not present. Although described herein in relation to FIG. 1 in conjunction with bicyclists, routes may be defined for pedestrians or for scooters including motorized scooters not otherwise allowed on certain roads, such as motorized scooters with an engine not exceeding 50 cubic centimeters (cc) or an electrical equivalent thereto.

Any of a wide variety of UAVs 14, such as drones or other types of controllable flying objects, may be utilized. The UAV of FIG. 1 is depicted to have a generally cylindrical shape. However, the UAV may have any of a variety of different shapes and sizes. The UAV is, however, advantageously configured so as to be readily visible by the driver of the vehicle 16 and, in one example embodiment, includes visible indicia, such as bright coloring and/or one or more reflectors, in order to increase the likelihood that a driver of an approaching vehicle will see the UAV.

The UAV 14 of some example embodiments, as shown in FIG. 2, may also include one or more light sources 29 that are activated, at least in certain circumstances, while the UAV is flying along the road in order to further increase the likelihood that the driver of the vehicle will take note of the UAV and slow the vehicle and/or otherwise avoid the bicycle lane. In some embodiments, the light sources of a UAV may be controlled so as to flash or otherwise be illuminated in a pattern or sequence so as to further increase the likelihood that the driver of the approaching vehicle will see the UAV. The UAV of an example embodiment may also or alternatively include one or more audible sources 27, such as a horn, for emitting audible sounds, at least under certain circumstances, while the UAV is flying along the road in order to further increase the likelihood that the driver of an approaching vehicle will take note of the UAV. The audible source may be controlled so as to cause the audible sounds to be emitted in a pattern or sequence in order to further increase the likelihood that the driver of an approaching vehicle will hear and, in turn, see the UAV hovering above the roadway and, as a result, slow the vehicle and/or otherwise avoid the bicycle lane.

In some of the embodiments disclosed herein, UAVs 14 are described as providing visual or audible warnings or alerts to operators of motorized vehicles about the presence of one or more bicyclists traveling along a road ahead. In alternative embodiments, the UAVs may provide alerts using other technologies, such as by transmitting a message via cellular or other communications technology to an approaching vehicle, which receives the message and provides the message to the vehicle operator via a user interface of the vehicle or a device carried by an operator of the vehicle. In an alternative embodiment in which motorized vehicles operate autonomously or semi-autonomously, a UAV accompanying a bicyclist may transmit information to the motorized autonomous or semi-autonomous vehicle causing the motorized autonomous or semi-autonomous vehicle to move away from the bicyclist being accompanied by the UAV. A system 20 for defining a lane, e.g., a virtual lane, along a road segment 12, such as lane for bicycle traffic, pedestrians or scooters is depicted in FIG. 2. As shown, the system includes an apparatus 22 embodied, for example, by a computing device, such as a computer, and one or more UAVs 14 that are deployed by and directed by the apparatus. The system of this example embodiment also includes a map database 24 that represents road segments in a geographic area. In this regard, the map database contains map data that indicates attributes of the road segments. The map database may also include map data indicative of sidewalks or other types of pedestrian segments, as well as open areas, such as grassy regions or plazas.

The map database 24 may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent bicycle lanes, pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 24 may be a master map database, such as a high definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a motorized vehicle 16. The navigation-related functions can correspond to vehicle navigation, pedestrian navigation, or other types of navigation.

As mentioned above, the map database 24 may be a master geographic database, but in alternate or complementary embodiments, a client side map database may represent a compiled navigation database that may be used in or with end user devices to provide navigation and/or map-related functions. In such a case, the map database can be downloaded or stored on the end user device which can access the map database through a wireless or wired connection, such as a communications network.

Referring now to FIG. 3, an apparatus 22 is depicted that is configured to perform various functions as described below including being configured to define a bicycle route for a bicyclist, being configured to guide a bicyclist, a pedestrian or a scooter along the route and/or being configured to define a lane for bicycle traffic on a road segment upon which motorized vehicles 16 operate. The apparatus may be embodied by a computing device, such as a computer, a mobile terminal, such as a personal digital assistant (PDA), mobile telephone, smart phone, personal navigation device, wearable device, smart watch, tablet computer and/or other device that can perform navigation-related functions, such as digital routing and map display, or a fixed computing device, such as a computer workstation, a navigation system or the like. Alternatively, the apparatus and optionally other components of the system 20, such as the map database 24 and/or the UAV database 28 (described below) may be at least partially embodied by a server and/or cloud system, such as a computer services platform, that receives, stores and/or analyses a variety of data, such a map data, traffic data, weather data, data regarding the UAVs 14 and/or data provided by other devices, such as devices carried by motorized vehicles and/or bicyclists. The data may be analysed so as to perform various services including, for example, defining a bicycle route for a bicyclist, accompanying a bicyclist, a pedestrian or a scooter along the route and/or defining a lane for bicycle traffic on a road segment upon which motorized vehicles operate, such as described below.

As shown in FIG. 3, the apparatus 22 includes, is associated with or is otherwise in communication with a processor 30, a memory device 32, a communication interface 34 and optionally a user interface 36. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 30 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 30 may be configured to execute instructions stored in the memory device 32 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 22 of an example embodiment may also optionally include a communication interface 34 that may be any means such as a device or circuitry embodied in either hardware or a combination of hardware and software that is configured to receive and/or transmit data from/to other electronic devices in communication with the apparatus. Additionally or alternatively, the communication interface may be configured to communicate over Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

The apparatus 22 of an example embodiment may also include or otherwise be in communication with a user interface 36. The user interface may include a touch screen display, a speaker, physical buttons, and/or other input/output mechanisms. In an example embodiment, the processor 30 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 32, and/or the like).

Referring now to FIG. 4, the operations performed, such as by the apparatus 22 of FIG. 3, in order to define a bicycle route for a bicyclist are depicted in accordance with an example embodiment. As shown in block 40, the apparatus of an example embodiment includes means, such as the processor 30, the memory device 32 or the like, for accessing a map database 24 that represents road segments in a geographic area. The map database includes map data that indicates attributes of the road segments. The memory device may include the map database in some embodiments, while the map database is separate from the memory device in other embodiments as shown in FIG. 2.

The apparatus 22 of this example embodiment also includes means, such as the processor 30 or the like, for defining the bicycle route from an origin to a destination based upon the map data indicative of attributes of road segments including, for example, the width of the road segments, the functional class of the road segments, the posted speed limits along the road segments, the anticipated traffic along the road segments, etc. See block 42 of FIG. 4. In some embodiments, the apparatus, such as the processor, may also take into account map data indicative of other features, such as sidewalks, parks or other open areas, in conjunction with the definition of the bicycle route since the bicycle route can also extend through or along these other features. The origin and destination may be defined by a bicyclist 10 and provided to the apparatus, such as via the communication interface 34, the user interface 36 or the like. Alternatively, the origin and destination may be predefined, such as in an instance in which a plurality of bicycle routes of various lengths and levels of difficulty are defined between various origins and destinations in order to provide a plurality of predefined bicycle routes for the bicyclists. In accordance with an example embodiment, the apparatus, such as the processor, is configured to define the bicycle route to include one or more road segments that allow bicycle traffic unaccompanied by a UAV 14 and one or more road segments for which bicycle traffic is unauthorized unless accompanied by the UAV, such as one or more expressways.

The apparatus 22, such as the processor 30, of an example embodiment may be configured to determine whether the road segments allow bicycle traffic unaccompanied by a UAV 14 or do not allow bicycle traffic unless accompanied by a UAV based upon the attributes associated with the road segments and contained by the map data within the map database 24. In this regard, the map data may include a specific indication as to whether a road segment permits bicyclists unaccompanied by a UAV or only permits bicyclists when accompanied by a UAV. The map data for still other road segments may include an indication that bicycle traffic is not authorized under any circumstances. In other embodiments, the map data may not include specific indicators as to whether bicycle traffic is authorized or is unauthorized, and if unauthorized, whether bicycle traffic is unauthorized under all conditions or unless accompanied by a UAV, but the apparatus, such as the processor, is configured to infer whether a road segment allows, without restriction, bicycle traffic or if the road segment, instead, restricts bicycle traffic, either completely or unless accompanied by a UAV. For example, the map data may include an indication that one or more road segments include bicycle lanes, thereby providing an indication that bicycle traffic is allowed without restriction and, as a result, without accompaniment by a UAV.

Still further, the apparatus 22, such as the processor 30, may be configured to infer that bicycle traffic is permitted along a road segment and need not be accompanied by a UAV 14 in an instance in which the width of the lanes of the road segment 12 exceeds a predefined width threshold and the posted speed limit for the road segment is below a predefined speed threshold. Conversely, in instances in which a road segment does not include a bicycle lane and has lanes with a width that is less than the predefined width threshold and/or has a posted speed limit above a predefined speed threshold, the apparatus, such as the processor, may be configured to infer that from the attributes included in the map data for the road segment that the road segment does not permit bicycle traffic unless accompanied by a UAV. While several examples have been provided above with respect to attributes or combinations of attributes that may be considered in order to infer whether bicycle traffic is permitted without restriction or is unauthorized and only permitted if accompanied by a UAV, the apparatus, such as the processor, may be configured to analyze different attributes or different combinations of attributes in other embodiments in order to infer whether bicycle traffic is permitted under all circumstances or if bicycle traffic is unauthorized and is permitted only if accompanied by a UAV.

Referring now to FIG. 5, an illustration of one example of a bicycle route is depicted. The route may be provided to a bicyclist via an app on a mobile device carried by the bicyclist. The route is calculated using the map database 24 and route calculation programming, such as provided by a navigation application. The route includes an origin at location 50 and a destination designated 52. In this example, each linear segment of the route represents a respective road segment. The road segments 54 are bicycle paths that allow only bicycle traffic, but not motorized vehicle traffic. The road segments labeled 56 allow motorized vehicles and bicycle traffic unaccompanied by a UAV. In contrast, on the road segments labeled 58, bicycle traffic is unauthorized unless accompanied by a UAV 14. For example, the road segments 58 in FIG. 5 may be an expressway upon which bicycle traffic is unauthorized unless accompanied by a UAV. By defining a bicycle route in accordance with an example embodiment of the present disclosure, different bicycle routes may be created by selectively utilizing road segments for which bicycle traffic is unauthorized unless accompanied by a UAV. Other bicycle routes may have different origins and destinations and may include any number of road segments in total and any number of road segments for which bicycle traffic is unauthorized unless accompanied by a UAV.

As shown in block 44 of FIG. 4, the apparatus 22 of this example embodiment includes means, such as the processor 30, the communication interface 34, the user interface 36 or the like, for providing the bicycle route to the bicyclist or a device accessible to the bicyclist. Upon receipt of the bicycle route, the bicyclist may thereafter choose to utilize the bicycle route by bicycling therealong.

In an example embodiment the apparatus 22 of this example embodiment also includes means, such as the processor 30, the communication interface 34 or the like, for causing the UAV 14 to fly along at least a portion of the route in association with the bicyclist. See block 46 of FIG. 4. For example, the bicyclist may provide input, such as via the communication interface, the user interface 36 or the like, indicating that the bicyclist plans to ride along the bicycle route beginning at the origin at a certain day and time. In response, the apparatus, such as the processor, the communication interface or the like, may cause the UAV to fly along at least a portion of the bicycle route and in association with the bicyclist. While the apparatus, such as the processor, the communication interface or the like, may be configured to cause the UAV to fly along the entirety of the bicycle route, the apparatus, such as the processor, the communication interface or the like, of this example embodiment causes the UAV to fly in association with the bicyclist along at least the one or more road segments of the bicycle route for which bicycle traffic is unauthorized unless accompanied by a UAV.

The UAV 14 may be configured to fly at a predetermined speed such that bicyclist 10 bicycling at the same predetermined speed keeps pace with the UAV. However, the UAV in some embodiments are configured to detect the presence of the bicyclist, such as by detecting the presence of a mobile device, such as a smart phone, carried by the bicyclist, and/or a radio frequency identification (RFID) tag attached to the bicycle or the bicyclist or by utilizing other, for example, proximity-based communication techniques. In this example embodiment, the UAV is configured to fly along with the bicyclist at the same average pace that the bicyclist is traveling by remaining in proximity to the bicyclist as determined in accordance with the foregoing proximity-based detection and, in some embodiments, communication techniques.

As shown in FIGS. 1 and 3, the apparatus 22 of an example embodiment includes means, such as the processor 30, the communication interface 34 or the like, for causing the UAV 14 to fly behind the bicyclist as the bicyclist rides along a least a portion of bicycle route. See, for example, the left-most UAV in FIG. 1. As such, the UAV can alert drivers of motor vehicles approaching the bicyclist from the rear as to the presence of the bicyclist. In order to more consistently gain the attention of the drivers of the motor vehicles, the UAV may be caused to fly slightly offset from the bicyclist so as to remain slightly displaced towards the path of travel of the vehicles, such as by flying on or slightly off the left shoulder of the bicyclist in the example of FIG. 1.

In some embodiments, further measures may be taken in order to deter motorists from passing too close to the bicyclist 10. For example, the UAV 14 of an example embodiment may include (as shown in FIG. 2) an image capture system 25, such as a camera or other image sensor, configured to capture an image of a vehicle proximate to the bicyclist. The image capture system of the UAV may be carried by the UAV and may be configured to capture images of every vehicle that is proximate the bicyclist while the UAV flies along a portion of the bicycle route in association with the bicyclist.

Alternatively, the image capture may be conditioned upon one or more parameters. For example, the apparatus 22, such as the processor 30, or the UAV 14 may be configured to determine the speed of the vehicle approaching the bicyclist utilized one or more sensors. As such, the system 20 and, in one embodiment, the UAV includes one or more sensors 26, such as radar, light detection and ranging (LIDAR) or imaging sensors, for capturing information regarding vehicles in proximity to the bicyclist from which the speed of the vehicle may be determined. In instances in which the speed of the vehicle exceeds a determined threshold, the UAV is configured to capture an image of the vehicle. Thus, in some embodiments, the apparatus, such as the processor, the communication interface 34 or the like, is configured to cause the image capture system 25 to capture an image of the vehicle in an instance in which the speed of the vehicle exceeds a determined threshold. This image may subsequently be provided to law enforcement along with an indication of the speed of the vehicle, the location at which the image was captured, and the day and time at which the image was captured in order to deter such behavior.

In addition or alternatively, the image capture may be conditioned upon the distance between the vehicle and the bicyclist 10 or, in some embodiments, the distance between the vehicle and the UAV 14 as a proxy for the bicyclist. In this example embodiment, the one or more sensors 26, such as the radar, LIDAR or imaging sensors, are configured to determine the relative location of the vehicle and the distance from the bicyclist to the vehicle. In this example embodiment, in an instance in which the UAV determines that the vehicle is within a predetermined distance threshold of the bicyclist (or the UAV as a proxy for the bicyclist) or, in some embodiments, when the apparatus 22, such as the processor 30, the communication interface 34 or the like, determines that the distance to the vehicle is less than a predetermined distance threshold, the image capture system 25 of the UAV is instructed to capture an image of the vehicle which may be utilized as described above.

In another example embodiment, the apparatus 22 is configured to cause the UAV 14 to fly into the path of travel of the vehicle under certain circumstances in order to further alert the driver of the vehicle of the presence of the bicyclist 10. In this example embodiment, the apparatus 22, such as the processor 30, or the UAV 14 may be configured to determine the speed of an approaching vehicle and/or the distance to an approaching vehicle, such as described above. In an instance in which the distance between the vehicle and the bicyclist is less than a defined separation distance and/or in an instance in which the speed of the vehicle exceeds a determined threshold, the UAV of this example embodiment is configured to fly into the path of travel of the vehicle in order to even more clearly alert the driver of the vehicle as to presence of the bicyclist and to encourage the driver of the vehicle to steer their vehicle away from the bicyclist and/or to slow their vehicle. In some embodiments, the apparatus, such as the processor, the communication interface 34 or the like, is configured to provide instructions to the UAV to cause the UAV to cause the UAV to fly into the path of travel of the vehicle as described above, such as in an instance in which the distance between the vehicle and the bicyclist is less than a defined separation distance.

In some embodiments, the UAV 14 is available and is configured to fly along at least that portion of the bicycle route for which bicycle traffic is unauthorized unless accompanied by a UAV at any time dependent only upon the day and time that the bicyclist chooses to proceed along the bicycle route. In other embodiments, however, the UAV has a predefined flight schedule. As such, the UAV of these embodiments operates as a ferry by accompanying a bicyclist along one or more road segments at specific times in accordance with the predefined flight schedule. In this example embodiment, the UAV is preconfigured so as to fly along one more road segments, such as one or more road segments for which bicycle traffic is unauthorized unless accompanied by a UAV, at a predefined day and time, such as weekday mornings at 5:00 am, weekend afternoons at 3:00 pm or the like. In this example embodiment, a bicyclist seeking to define a bicycle route that may include one or more road segments for which bicycle traffic is unauthorized unless accompanied by a UAV may provide a day and a time, such as a time range, during which the bicyclist plans to ride along the bicycle route. In this example embodiment, the apparatus 22 includes means, such as the processor 30 or the like, for defining the bicycle route in such a manner as to establish the bicycle route at least partially based upon the flight schedule the UAV along the one or more road segments for which bicycle traffic is unauthorized unless accompanied by a UAV. The flight schedule of the UAV may be provided by the UAV to the apparatus, such as via the communication interface 34. Alternatively, the flight schedule may be stored by the memory device 32 or by a UAV database 28 as shown in FIG. 2 that is accessible by the apparatus.

In this example embodiment, the apparatus 22, such as the processor 30, establishes the bicycle route such that a bicyclist proceeding along the bicycle route on the day and time identified by the bicyclist will ride along the one or more road segments for which bicycle traffic is unauthorized unless accompanied by a UAV 14 at a time that coincides with the flight schedule of the UAV such that the UAV will be available to accompany the bicyclist along the one or more road segments for which bicycle traffic is unauthorized unless accompanied by a UAV while continuing to adhere to its flight schedule. For example, relative to the bicycle route at FIG. 5, in an instance in which the flight schedule of the UAV indicates that the UAV flies along the road segment for which bicycle traffic is unauthorized unless accompanied by a UAV at 3:00 pm on Saturdays and the bicyclist indicates that the bicyclist plans to ride between 2:00 pm and 5:00 pm on Saturday, the bicycle route may be defined such that the bicyclist begins at 2:00 pm at the origin and arrives at the beginning of the road segment for which bicycle traffic is unauthorized unless accompanied by the UAV at 3:00 pm, thereby coinciding with the flight schedule of the UAV In order to synchronize with the fight schedule of the UAV 14 as described above, the apparatus 22 of an example embodiment includes means, such as the processor 30 or the like, for determining the speed at which the bicyclist 10 needs to travel on the one or more road segments that allow bicycle traffic unaccompanied by the UAV, such as the one or more road segments that allow bicycle traffic unaccompanied by a UAV that precede the road segment for which bicycle traffic is unauthorized unless accompanied by a UAV, in order arrive at the road segment for which bicycle traffic is unauthorized unless accompanied by a UAV at a time that coincides with the flight schedule of the UAV, such as at a time that coincides with the time at which the UAV will fly along the road segment for which bicycle traffic is unauthorized unless accompanied by a UAV in accordance with the flight schedule of the UAV. In the foregoing example relative to the bicycle route of FIG. 5, the apparatus, such as the processor, is configured to determine the speed or minimum speed at which the bicyclist should ride along the road segments 54, 56 of the bicycle route that precedes the road segments 58 for which bicycle traffic is unauthorized unless accompanied by a UAV such that the bicyclist will arrive at the beginning of the road segment for which bicycle traffic is unauthorized unless accompanied by a UAV at 3:00 pm on Saturday so as coincide with the time defined by the flight schedule of the UAV at which the UAV will fly along that same road segment.

In this example embodiment, the apparatus 22, such as the processor 30, may be configured to monitor the progress of the bicyclist 10 along the road segment(s) that precedes the road segment for which bicycle traffic is unauthorized unless accompanied by a UAV. In instances in which the rate of travel of the bicyclist along the preceding road segment(s) deviates from the speed at which the bicyclist needs to travel to arrive at the road segment for which bicycle traffic is unauthorized unless accompanied by a UAV to a time that is no longer synchronized with the flight schedule of the UAV, the apparatus, such as the processor, the communication interface 34, the user interface 36 or the like, may be configured to alert the bicyclist, or to alert the UAV which may be pacing the bicyclist, to alter his or her speed, such as to either increase or decrease the speed, in order to arrive at the road segment for which bicycle traffic is unauthorized unless accompanied by the UAV in synchronization of the flight schedule of the UAV. Alternatively, the apparatus, such as the processor, the communication interface 34, the user interface 36 or the like, may be configured to advise the bicyclist to meet with a later scheduled UAV if the bicyclist is traveling too slowly.

In some embodiments including those in which a UAV 14 has a predefined flight schedule and those for which the UAV operates without a predefined flight schedule, the UAV may be configured to fly at a predefined speed. As such, in constructing the bicycle route, the apparatus 22, such as the processor 30, of an example embodiment is configured to determine the speed at which the UAV will fly. For example the apparatus, such as the processor, is configured to access the memory device 32 or the UAV database 28 that includes information defining the speed at which the UAV will fly. As described below, the UAV database of an example embodiment may identify each of the UAVs and provide an indication of the schedule of flights for the UAVs (including both the route and the time at which the route will be flown) as well as the predetermined speeds at which the UAVs will fly.

As such, the apparatus 22 includes means, such as the processor 30, the memory devise 32 or the like, for determining the speed at which the UAV 14 will fly along the one or more road segments for which bicycle traffic is unauthorized unless accompanied by a UAV. In this example embodiment, the apparatus also includes means, such as the processor, the communication interface 34, the user interface 36 or the like, for providing the speed at which the UAV will fly to the bicyclist along with the bicycle route. Thus, the bicyclist 10 will be advised in advance as to the speed at which the UAV will fly and, in instances in which the UAV will fly at speed that is unacceptable to the bicyclist, such as either being either too fast or too slow, the bicyclist my elect not to utilize the bicycle route.

In some embodiments, a plurality of UAVs 14 are available to accompany the bicyclist 10 along the one or more road segments for which bicycle traffic is unauthorized unless accompanied by a UAV. In these embodiments, at least some of the plurality of UAVs may be configured to fly at different speeds (e.g., 5 mph, 10 mph, 15 mph, etc.) along the same one or more road segments with the speed at which each of the UAVs flies being stored, such as by the memory devise 32, the UAV database 28 or otherwise in a manner accessible to the processor 30. As such, the apparatus 22 of this example embodiment includes means, such as the processor, the memory devise or the like, for determining the speed at which each of the plurality of UAVs that are available to fly along the one or more road segments for which bicycle traffic is unauthorized unless accompanied by a UAV. Additionally, the apparatus of this example embodiment includes means, such as the processor, the communication interface 34, the user interface 36 or the like, for providing the speeds at which each of the plurality of UAVs will fly along the road segment(s) to the bicyclist, such as in conjunction with the bicycle route.

In this example embodiment, the bicyclist therefore has options to ride in association with different UAVs 14 configured to fly at different speeds such that bicyclists may elect to ride with a UAV that will fly at a predetermined speed at which the bicyclists expect to be cycling. In some embodiments, the bicyclist may provide input, such as via the user interface 36, that selects one of the UAVs to accompany the bicyclist along at least the road segment for which bicycle traffic is unauthorized unless accompanied by a UAV with the selected UAV being scheduled to fly at a predetermined speed that coincides with the speed at which the bicyclist will be cycling along the road segment(s), thereby permitting the apparatus 22, such as the processor 30, to reserve use the selected UAV by the bicyclist.

With respect to causing the UAV 14 to fly along at least a portion of the bicycle route in association with the bicyclist 10, the apparatus 22 of an example embodiment includes means, such as the processor 30, the communication interface 34 or the like, for deploying one or more UAVs to define a lane, such as virtual lane, for bicycle traffic on a road segment on which motorized vehicles 16 operate. As shown in FIG. 1, the lane may be adjacent to a portion of the one or more road segments upon which motorized vehicles operate. The road segments upon which a lane for bicycle traffic is defined may be road segments that allow bicycle traffic and/or road segments for which bicycle traffic is unauthorized unless accompanied by a UAV.

Although a single UAV 14 may be deployed to fly with a bicyclist 10, the system 20 of an example embodiment may deploy a plurality of UAVs that may fly at the same speed, such as at a predetermined speed, along with one or more bicyclists, as shown in FIG. 1. In an embodiment in which multiple UAVs are deployed, the UAVs may be spaced along the road segment, such as by being spaced apart along the road segment with a spacing equal to about 20 meters, 30 meters, 50 meters, or the like. In at least some embodiments, as shown in FIG. 1, one or more of the UAVs may include a light source 29, such as a visible light source, e.g., a light emitting diode (LED) array or the like, for directing light onto the road segment along which the UAV flies in order to define, for example, the boundary of the virtual bicycle lane.

As shown in FIG. 1, for example, the light sources of the UAVs project light onto the road segment so as to cause a dashed line 18 to be presented, thereby defining a boundary of the virtual lane.

As described above, the one or more UAVs 14 may be deployed so as to define a lane for bicycle traffic along one or more road segments according to a schedule. The schedule may be modified based upon one or more factors. For example, the system 20 of an example embodiment, such as the apparatus 22, e.g., the processor 30 or the like, is configured to modify the UAV schedule based on a projected demand. Thus, bicyclists may subscribe or otherwise sign up to participate in a ride along a bicycle route to be guided by one or more UAV on a particular day and time. In an instance in which the number of bicyclists who subscribe or otherwise sign up for the ride is less than a predefined minimum threshold, the schedule of the UAV(s) may be modified or the deployment of the UAV(s) may be cancelled. Alternatively, in an instance in which the number of bicyclists who subscribe or otherwise sign up for a ride exceeds a predetermined maximum threshold, additional UAVs may be deployed to fly along with the bicyclists such that additional bicycle routes may be defined or, for a single bicycle route, such that the additional UAVs may be stretched over a longer span of the road segment and a more elongated virtual lane may be defined so as to accommodate the additional bicyclists.

The schedule may also be modified based upon weather conditions, and/or traffic conditions. For example, the apparatus 22 of this example embodiment includes means, such as the processor 30, the communication interface 34 or the like, for receiving information regarding the weather conditions along the bicycle route and/or information regarding the traffic conditions along the bicycle route, such as both the current weather or traffic conditions and the projected weather or traffic conditions in the upcoming hours and days. In instances in which the weather conditions are adverse, such as with rain, sleet or snow, or in which the traffic conditions are adverse, such as congested traffic conditions, a wreck or construction, at the day and time at which the UAV 14 is to fly, the apparatus, such as the processor, is configured to modify the schedule or to cancel the flight of the UAV during time period(s) that coincide with the adverse weather conditions and/or adverse traffic conditions. With respect to adverse weather conditions, modification or cancellation of the flight of the UAV may be advisable both because few if any bicyclists will utilize the lane created by the UAVs during such adverse weather conditions and also since motorized vehicles may need or wish to have a wider expanse of the road segment available for use without sharing the road segment with one or more bicyclists when driving in such adverse weather conditions. Depending on weather or traffic conditions, the flight speed of the UAV may be modified. For example, in adverse weather conditions, the flight speed of the UAV may be lower to accommodate a slower speed at which bicycles accompanying the UAV may travel. As another example, the schedule flight time may be revised based upon adverse weather or traffic conditions so as to be reschedule to a day and time during which the weather conditions and the traffic conditions are anticipated to be more favourable.

By defining a lane for bicycle traffic with one or more UAVs 14 that accompany bicyclists 10, the flexibility with which the road network may support additional modes of transportation is enhanced. However, the utilization of lanes for bicycle traffic defined by UAVs as opposed to more permanent bicycle lane markings on the surface of the road segment permits bicyclists to utilize the road segment, but does not permanently limit the width of the road segment available to motorized vehicles in the same manner that is accomplished by the use of permanent markings on the surface of the road segment for bicycle lanes. Thus, motorized vehicles are permitted to utilize the full width of the road segment in instances in which bicyclists are not concurrently utilizing the road segment and a virtual lane is not defined by one or more UAVs. Another advantage of the utilization of lanes for bicycle traffic defined by UAVs as opposed to painted bicycle lane markings on the surface of the road segment is that it allows for reducing or eliminating the cost of maintaining the painted bicycle lane markings.

While described above in conjunction with bicyclists 10, one or more UAVs 14 may also be configured to accompany individuals utilizing other forms of transportation, such as pedestrians or scooters with an engine not exceeding 50 cc or an electric equivalent thereto, such as Segway personal transports or small scooters that a rider stands upon, but not motorcycles or other motorized vehicles. (Although the 50 cc engine size is referred to in connection with some embodiments, this limitation is related to traffic regulations that apply in some countries that allow larger engine motorcycles on some roads, but prohibit smaller engine motorcycles or scooters, such as those with a 50 cc or smaller motor, on those roads. In countries or jurisdictions that have different size restrictions, including different restrictions on the size of allowed vehicles, embodiments of the system may be modified accordingly with the scooters being limited to those having an engine that does not exceed the regulated lower limit for use on roads.)

In this example embodiment, as shown in block 60 of FIG. 6, the apparatus 22 of this example embodiment includes means, such as the processor 30, the communications interface 34, the user interface 36 or the like, for providing information regarding a route along which a UAV 14 is scheduled to fly at a determined time. In this example embodiment, a schedule of routes along which one or more UAVs will fly may be predefined and stored, for example, by the memory device 32 or a UAV database 28 accessible by the processor. With respect to the example of a route depicted in FIG. 5, a schedule may be defined that indicates that a UAV will guide the bicyclist, a pedestrian or a scooter, including a motorized scooter with an engine not exceeding 50 cc or an electric equivalent thereto along the route beginning at the origin at 5:00 AM each weekday and at 3:00 PM each Saturday and Sunday. As such, a bicyclist, a pedestrian or a scooter may review the schedule for UAV flights along the road segments 58 and, if desired, may be at the origin 50 of the route at the time at which the UAV will commence its flight along the road segments 58.

In addition to providing information regarding the route and the determined time at which the UAV 14 will fly along the route, the apparatus 22 may include means, such as the processor 30, the communications interface 34, the user interface 36 or the like, for providing information regarding the speed at which the UAV is scheduled to fly between the origin and the destination. As such, the bicyclist, pedestrian or scooter rider can determine, not only the route to be taken and the time that the route will commence, but also the speed at which the bicyclist, the pedestrian or the scooter wishes to travel along the route. Thus, the information stored by the memory device 32 or the UAV database 28 may include not only the schedule of flights for the UAVs, but also the predetermined speeds at which the UAVs will fly. The bicyclist, the pedestrian or a scooter rider may then select the type of route which matches their expectations, both in terms of timing and speed.

As shown in block 62 of FIG. 6, the apparatus 22 of this example embodiment also includes means, such as the processor 30, the communications interface 34 or the like, for causing the UAV 14 to fly along the route at the determined time in order to accompany the bicyclist, the pedestrian or the scooter along the route.

As noted above, the schedule may be modified based upon one or more factors. For example, the apparatus 22, such as the processor 30 or the like, is configured to modify the UAV schedule based on a projected demand. Thus, bicyclists, pedestrians or scooter riders may subscribe or otherwise sign up to travel along the route with the one or more UAVs 14 on a particular day and time. In an instance in which the number of bicyclists, pedestrians or scooter riders who subscribe or otherwise sign up is less than a predefined minimum threshold, the schedule of the UAV(s) may be modified so as to cancel the deployment of the UAV(s). See blocks 64 and 66 of FIG. 6. Additionally or alternatively, the schedule may also be modified based upon weather conditions or traffic conditions. For example, the apparatus of this example embodiment includes means, such as the processor, the communication interface 34 or the like, for receiving information regarding the weather conditions or traffic conditions along the route on the day and at the time at which the UAV is scheduled to fly. The weather and/or traffic conditions may be received from various sources including the map database 24, online weather and/or traffic sources or the like.

In instances in which the weather conditions are adverse, such as with rain, sleet or snow, or traffic conditions are adverse, such as by being congested, at the day and time at which the UAV 14 is to fly, the apparatus 22, such as the processor 30, is configured to modify the schedule by cancelling the flight of the UAV during time period(s) that coincide with the adverse weather conditions or adverse traffic conditions. See blocks 68 and 66 of FIG. 6. In some embodiments, the schedule may be modified by changing the time associated with the flight of the UAV, such as by delaying the flight or moving up the start time of the flight, and/or by modifying the route so as to no longer coincide with the adverse weather and/or traffic conditions.

FIGS. 4 and 6 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 32 of an apparatus employing an embodiment of the present invention and executed by a processor 30. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, in some of the embodiments disclosed herein, UAVs 14 are described as flying along a road accompanying one or more bicyclists. In another alternative, the UAV is not necessarily airborne (e.g., an Unmanned Not Airborne Vehicle, "UNAV"). According to this alternative, the UNAV may be unmanned, but operate on and move along the ground. According to this alternative, the non-airborne UNAV may utilize autonomous vehicle technology to accompany bicyclists and provide virtual bicycle lanes. The non-airborne UNAVs used for accompanying bicycles may be small in size since the non-airborne UNAV does not necessarily need to carry passengers. For purposes of this disclosure, pedestrians include runners, skaters, skateboarders, cross-country skiers, tricycles and operators of devices like the Segway.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus configured to define a bicycle route for a bicyclist, wherein the apparatus comprises at least one processor and memory including computer program code, the memory and the computer program code configured to, with the at least one processor, cause the apparatus to perform at least the following:

accessing a map database that represents road segments in a geographic area, wherein the map database contains map data that indicates attributes of the road segments;

defining the bicycle route from an origin to a destination based upon the map data indicative of attributes of the road segments, wherein defining the bicycle route comprises defining the bicycle route to include one or more road segments that allow bicycle traffic unaccompanied by an unmanned air vehicle (UAV) and one or more road segments for which bicycle traffic is unauthorized unless accompanied by the UAV;

providing the bicycle route to the bicyclist or a device accessible to the bicyclist; and in response to receiving an input indicating the bicyclist is to utilize the bicycle route:
   causing the UAV to fly along at least a portion of the bicycle route in association with the bicyclist.

2. The apparatus of claim 1 wherein the memory and the computer program code are configured to, with the at least one processor, cause the apparatus to cause the UAV to fly by causing the UAV to fly behind the bicyclist as the bicyclist rides along at least a portion of the bicycle route.

3. The apparatus of claim 1 wherein the UAV is configured to fly into a path of travel of a vehicle in response to a determination that a distance between the vehicle and the bicyclist is less than a defined separation distance or that a speed of the vehicle exceeds a determined threshold.

4. The apparatus of claim 1 wherein the memory and the computer program code are further configured to, with the at least one processor, cause the apparatus to define the bicycle route by establishing the bicycle route at least partially based upon a flight schedule of the UAV along the one or more road segments for which bicycle traffic is unauthorized unless accompanied by the UAV.

5. The apparatus of claim 4 wherein the memory and the computer program code are further configured to, with the at least one processor, cause the apparatus to determine a speed at which the bicyclist needs to travel on the one or more road segments that allow bicycle traffic unaccompanied by the UAV in order to arrive at the one or more road segments for which bicycle traffic is unauthorized unless accompanied by the UAV in order to synchronize with the flight schedule of the UAV.

6. The apparatus of claim 1 wherein the memory and the computer program code are further configured to, with the at least one processor, cause the apparatus to determine a speed at which the UAV will fly along the one or more road segments for which bicycle traffic is unauthorized unless accompanied by the UAV, and wherein the memory and the computer program code are configured to, with the at least one processor, cause the apparatus to provide the bicycle route by also providing the speed at which the UAV will fly to the bicyclist.

7. An apparatus configured to define a bicycle route for a bicyclist, wherein the apparatus comprises at least one processor and memory including computer program code, the memory and the computer program code configured to, with the at least one processor, cause the apparatus to perform at least the following:

accessing a map database that represents road segments in a geographic area, wherein the map database contains map data that indicates attributes of the road segments;

defining the bicycle route from an origin to a destination based upon the map data indicative of attributes of the road segments, wherein defining the bicycle route comprises defining the bicycle route to include one or more road segments that allow bicycle traffic unaccompanied by an unmanned air vehicle (UAV) and one or more road segments for which bicycle traffic is unauthorized unless accompanied by the UAV; and providing the bicycle route to the bicyclist or a device accessible to the bicyclist, wherein the UAV comprises an image capture system configured to capture an image of a vehicle proximate the bicyclist in response to a determination that a speed of the vehicle exceeds a determined threshold or that a distance between the vehicle and the bicyclist is less than a defined separation distance.

8. The apparatus of claim 7 wherein the memory and the computer program code are further configured to, with the at least one processor, cause the apparatus to cause the UAV to fly along at least a portion of the bicycle route in association with the bicyclist.

9. The apparatus of claim 8 wherein the memory and the computer program code are configured to, with the at least one processor, cause the apparatus to cause the UAV to fly by causing the UAV to fly behind the bicyclist as the bicyclist rides along at least a portion of the bicycle route.

10. The apparatus of claim 7 wherein the UAV is configured to fly into a path of travel of a vehicle in response to a determination that a distance between the vehicle and the bicyclist is less than a defined separation distance or that a speed of the vehicle exceeds a determined threshold.

11. The apparatus of claim 7 wherein the memory and the computer program code are further configured to, with the at least one processor, cause the apparatus to define the bicycle route by establishing the bicycle route at least partially based upon a flight schedule of the UAV along the one or more road segments for which bicycle traffic is unauthorized unless accompanied by the UAV.

12. The apparatus of claim 11 wherein the memory and the computer program code are further configured to, with the at least one processor, cause the apparatus to determine a speed at which the bicyclist needs to travel on the one or more road segments that allow bicycle traffic unaccompanied by the UAV in order to arrive at the one or more road segments for which bicycle traffic is unauthorized unless accompanied by the UAV in order to synchronize with the flight schedule of the UAV.

13. The apparatus of claim 7 wherein the memory and the computer program code are further configured to, with the at least one processor, cause the apparatus to determine a speed at which the UAV will fly along the one or more road segments for which bicycle traffic is unauthorized unless accompanied by the UAV, and wherein the memory and the computer program code are configured to, with the at least one processor, cause the apparatus to provide the bicycle route by also providing the speed at which the UAV will fly to the bicyclist.

* * * * *